July 26, 1949.  W. E. KAPPAUF ET AL  2,477,518
INTERPUPILLARY DISTANCE GAUGE HAVING MIRROR MEANS
Filed June 11, 1946

INVENTORS
WILLIAM E. KAPPAUF
WILFRED J. BROGDEN
BY M. C. Hayes
ATTORNEY

Patented July 26, 1949

2,477,518

UNITED STATES PATENT OFFICE 2,477,518

INTERPUPILLARY DISTANCE GAUGE HAVING MIRROR MEANS

William E. Kappauf, Princeton, N. J., and Wilfred J. Brogden, Madison, Wis., assignors, by mesne assignments, to the United States of America as represented by the Secretary of the Navy Application June 11, 1946, Serial No. 675,923
3 Claims. (Cl. 88—20)

This invention relates to devices for measuring interpupillary distances.

The effective use of any binocular instrument requires that the observer's pupil include the entire exit pupil of the appropriate ocular and that the visual axes of the observer's eyes be coincident with the optical axes of the instrument. These requirements are especially significant for such instruments as the stereoscopic rangefinder. In that instrument the target image is in the exact plane of the reticle only when the target is at one particular range, i. e., the range for which the objective lens is focussed. For all other ranges the images of the target and the reticle are not in the same plane. It is known that this difference causes serious errors in range readings if the observer's pupil does not include the entire exit pupil for each ocular and if the visual axes of the observer's eyes are not coincident with the optical axes of the range finder. To avoid range errors due to the conditions stated above, the interpupillary distance of the operator must be known and the oculars of the range finder set to within an accuracy of plus or minus 0.25 millimeter.

An object of the invention, therefore, is to provide an instrument capable of measuring interpupillary distances with a high degree of accuracy.

Another object of the invention is to provide an interpupillary distance gauge or interpupillometer which may be easily constructed from inexpensive materials, and which will be simple in its operation.

Other and ancillary objects and advantages of the invention will be apparent from a study of the following specification and drawings, in which.

Figure 1:
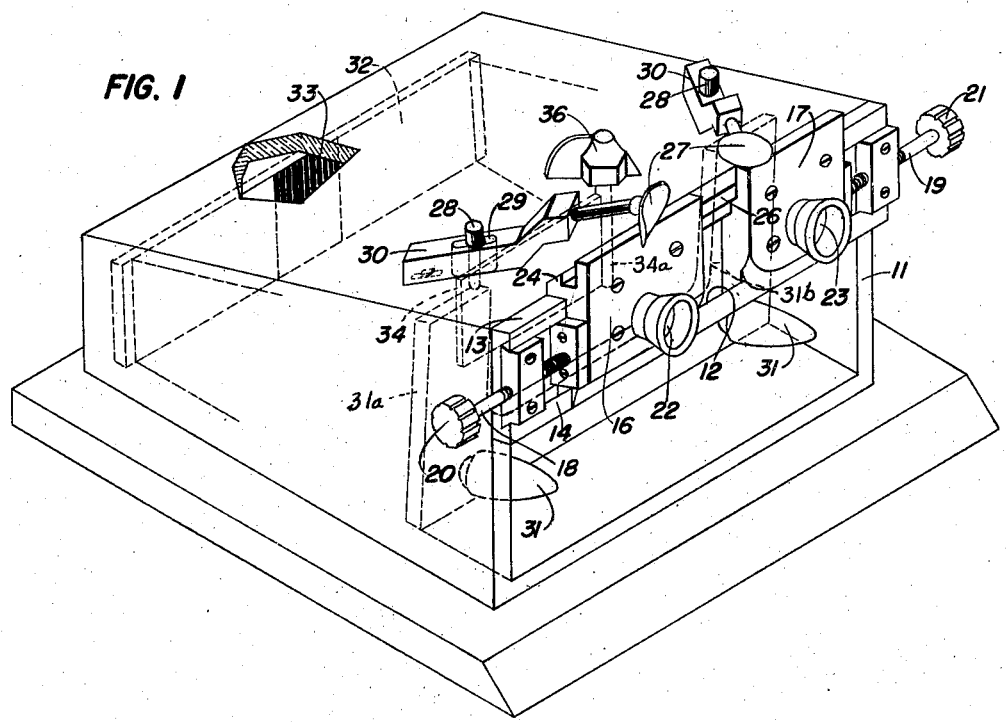
Fig. 1 is an isometric view of an interpupillometer made in accordance with the present invention.

In the drawings, particularly in Fig. 1, there is shown an interpupillometer carried by a case 11 of any suitable cabinet material but preferably of transparent plastic. The case has a slit 12 extending across its forward face and defined in part by upper and lower rails 13 and 14, respectively. The rails carry slides 16 and 17 adapted to move thereon transversely of the case in response to movement of adjustment screws 18 and 19, respectively. Knobs 20 and 21 are provided for manual operation of the adjustment screws.

Figure 2:
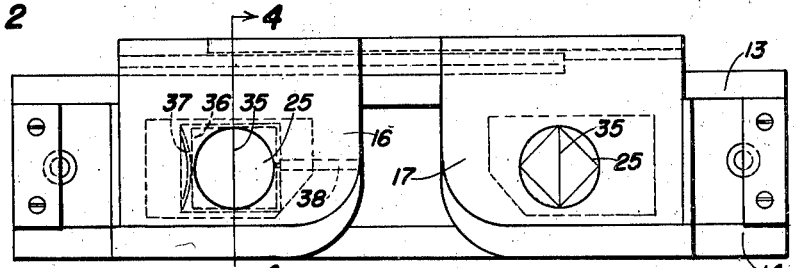
Fig. 2 is a diagrammatic front elevation view of the slide asembly containing the eye pieces.
Figure 3:
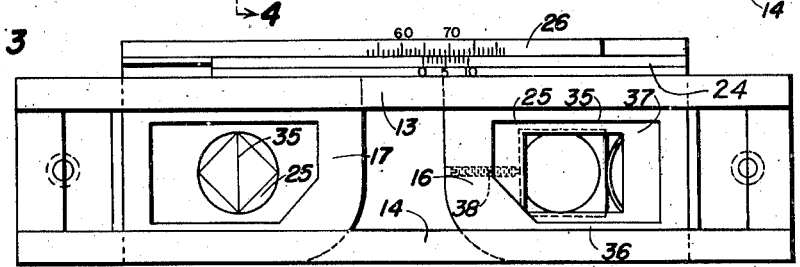
Fig. 3 is a diagrammatic rear view of the slide assembly depicted in Fig. 2 and illustrates a manner of attachment and operation of the measuring scales.
Figure 4:
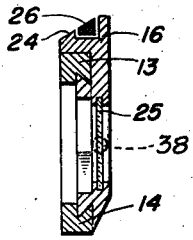
Fig. 4 is a sectional view taken along line 4—4 in the direction of the arrows in Fig. 2.

Slides 16 and 17 carry eye pieces 22 and 23, respectively the former containing a circular opening, the latter a diamond-shaped opening, as shown in Figs. 2 and 3. Both eye pieces carry glass insets 25 provided with vertical hair lines 35. Attached to slide 16 is a millimeter scale 24 which extends beyond the innermost end of the slide 16 and over part of slide 17. Slide 17 carries a scale 26, similarly disposed. The scales are movable longitudinally with respect to one another, their indicia being disposed adjacent to one another and in substantially the same plane. Head rests 27 are provided to maintain in any predetermined position the head of the person whose interpupillary distance is to be measured. The head rests are pivotally and adjustably mounted in the case 11 by means of pivots 28 cooperating with slots 29 in head rest bracket 30.

An electric light 31, connected to any convenient power source (not shown), is provided within the case below and rearward of each of the eye pieces to illuminate the pupils of the observer. The lights are mounted on a panel 31a which has a cut-out 31b providing a necessary mirror sight opening.

A mirror 32, fixed to the rearward inner wall of case 11 perpendicular to the visual axes of eye pieces 22 and 23, faces the eye pieces and provides visual means for determining when each pupil of the observer is bisected by the vertical hairlines of the eye pieces. A non-reflective strip 33 of black lacquer or the like in the center of the mirror serves to eliminate convergence of the observer's pupils by obscuring the reflection of one eye which would normally be seen by the opposite eye. As an additional precaution against such fusion of the mirror images, an occluder 34, pivotally mounted in the top of the case 11 by means of a spindle 34a and manipulated by a knob 36 on the exposed end of the spindle, is provided which may be placed between the mirror and either eye, thus allowing only the image of the unobstructed eye to appear in the mirror. Such fusion of images is further prevented by the dissimilar eye pieces, circular and diamond shaped, as previously described, which present fields sufficiently different to preclude convergence of the eye upon any but its own reflected image.

The glass inset 25 is carried by a frame 36 slidable in the slide 16. A spring 37 and a set screw 38 cooperate to adjust the frame 36, and hence the glass inset 25, permitting the latter to be placed in any given position within slide 16. Such adjustment provisions are employed in the calibration of the interpupillometer as will be hereinafter described.

In operating the interpupillometer the observer places his head against the head rests 27 in such a position that his eyes will be at the same level as the eye pieces 22 and 23. Positioning the occluder 34 to obstruct the right eye (for example), the observer then manipulates the left slide 16, through the knob 20 and screw 18, until the pupil of the left eye, peering through the left eye piece 22, and reflected in mirror 32, is bisected by the hairline 35 in that eye piece. Turning the occluder to obstruct the left eye, the observer then repeats this operation for the right eye. Interpupillary distance is then read from the scale 24 and 26 carried on the rearward side of the slides.

Calibration of the interpupillometer is effected in the following manner: The eye-cups (undesignated) are removed from the eye pieces 22 and 23. The slides 16 and 17 are then spaced so that the reading on the scales 24 and 26 closely approximates the interpupillary distance of the observer. The observer then measures the distance between the hair lines 35 by placing a millimeter scale across the eye pieces and making observations thereon, first with one eye and then the other without moving his head, from a distance of about ten inches. If the reading on the scales 24 and 26 equals that on the micrometer scale, the interpupillometer is properly adjusted. If these readings differ, the frame 36 is moved by turning set screw 38 in the proper direction to correct the error.

We claim:

1. In an interpupillary distance gauge, means for concentrating the sight of each eye upon its own reflected image, said means consisting of a fixed mirror, slides movable laterally of said mirror in a plane spaced forward thereof, an eye piece carried by each of said slides, each eye piece including an erect cross hair for bisecting the image of the corresponding eye in said mirror, a movable occluder mounted for movement into and out of the line of sight of said eye pieces for obscuring the vision of one eye piece while the other eye piece is positioned so that its cross hair bisects the image of the corresponding eye in said mirror, and interslidable scale bars respectively affixed to said slides and having graduations to provide a reading in terms of separation of said cross hairs after the images of both eyes have been bisected.

2. In an interpupillary distance gauge, a case having a forward face provided with a horizontal opening, a rear wall having a mirror confronting the opening, a pair of slides riding upon portions of the forward face, adjusting means carried by said case and operatively engaged with said slides to move them independently of each other on said forward face portions, an eye piece carried by each of said slides for viewing said mirror, each of said eye pieces being axially perpendicular to said mirror and having an erect hairline for bisecting the image of an eye pupil in said mirror, an occluder pivotally mounted by said case for obscuring the vision of said mirror by first one and then the other of said eye pieces so that one eye pupil at a time can be bisected by moving the corresponding hairline, said eye pieces being of different shapes so that the reflections of the eye pupils can be distinguished from one another, interslidable scale bars respectively affixed to said slides and having graduations to provide a reading in terms of separation of said hairlines after each eye pupil has been bisected, one of said eye pieces being movable relative to its slide to provide a means for adjusting the separation of said hairlines to correspond with the readings of said interslidable scale bars.

3. In an interpupillary distance gauge, means for concentrating the sight of each eye upon its own reflected image, said means consisting of a fixed mirror, slides movable laterally of said mirror in a plane spaced forwardly thereof, an eye piece carried by each of said slides, each eye piece including an erect cross hair for bisecting the image of the corresponding eye in said mirror, a movable occluder mounted for movement into and out of the line of sight of said eye pieces for obscuring the vision of one eye piece while the other eye piece is positioned so that its cross hair bisects the image of the corresponding eye in said mirror, interslidable scale bars respectively affixed to said slides and having graduations to provide a reading in terms of separation of said cross hairs after the images of both eyes have been bisected, one of said eye pieces being movable relative to its slide to provide a means for adjusting the separation of said hairlines to correspond with the readings of said interslidable scale bars.

WILLIAM EMIL KAPPAUF.
WILFRED JOHN BROGDEN.

REFERENCES CITED

The following references are of record in the file of this patent:

UNITED STATES PATENTS

| Number | Name | Date |
|---|---|---|
| 2,242,723 | Jobe | May 20, 1941 |
| 2,380,263 | Rees | July 10, 1945 |

FOREIGN PATENTS

| Number | Country | Date |
|---|---|---|
| 93,688 | Germany | Sept. 11, 1897 |